United States Patent [19]

Cordery et al.

[11] Patent Number: 5,793,867
[45] Date of Patent: Aug. 11, 1998

[54] SYSTEM AND METHOD FOR DISASTER RECOVERY IN AN OPEN METERING SYSTEM

[75] Inventors: Robert A. Cordery, Danbury; David K. Lee, Monroe; Leon A. Pintsov, West Hartford; Frederick W. Ryan, Jr., Oxford; Walter J. Baker, Stratford; Joseph Gargiulo, Trumbull; Richard W. Heiden, Monroe, all of Conn.

[73] Assignee: Pitney Bowes Inc., Stamford, Conn.

[21] Appl. No.: 574,743

[22] Filed: Dec. 19, 1995

[51] Int. Cl.$^6$ .................................................. H04K 1/00
[52] U.S. Cl. .................................................. 380/4; 380/24
[58] Field of Search .................................. 380/4, 24, 49, 380/30

[56] References Cited

U.S. PATENT DOCUMENTS

| | | |
|---|---|---|
| 4,459,582 | 7/1984 | Sheahan . |
| 4,627,016 | 12/1986 | Kirschner et al. . |
| 4,686,912 | 8/1987 | Fogleman et al. . |
| 4,725,718 | 2/1988 | Sansone et al. . |
| 4,757,537 | 7/1988 | Edelmann et al. . |
| 4,775,246 | 10/1988 | Edelmann et al. . |
| 4,809,185 | 2/1989 | Talmadge . |
| 4,831,555 | 5/1989 | Sansone et al. . |
| 4,858,138 | 8/1989 | Talmadge . |
| 4,873,645 | 10/1989 | Hunter et al. . |
| 4,918,601 | 4/1990 | Vermesse . |
| 5,146,068 | 9/1992 | Ugawa et al. . |
| 5,146,544 | 9/1992 | Altham et al. . |
| 5,185,798 | 2/1993 | Hamada et al. . |
| 5,297,200 | 3/1994 | Murray . |
| 5,353,350 | 10/1994 | Unsworth et al. . |
| 5,353,353 | 10/1994 | Vijeh et al. . |
| 5,396,558 | 3/1995 | Ishiguro et al. .................. 380/4 |
| 5,410,590 | 4/1995 | Blood et al. . |
| 5,479,509 | 12/1995 | Ugon .................................. 380/4 |

*Primary Examiner*—David Cain
*Attorney, Agent, or Firm*—Charles R. Malandra, Jr.; Melvin J. Scolnick

[57] ABSTRACT

System and method for securely backing up and reliably retrieving vault data in a metering system that includes a host processor operatively coupled to a vault. Whenever a transaction is completed by the vault, the vault cryptographically signs the vault data, including ascending register, descending register and piece count and sends the cryptographically signed vault data to the host processor where it is stored in a data file assigned to the vault. Each storage of the cryptographically signed vault data is indexed to create a historical log of vault transactions. If the vault is lost or damaged so that vault data cannot be retrieved from the vault, the cryptographically signed vault data is retrieved from the host processor data file and verified.

25 Claims, 4 Drawing Sheets

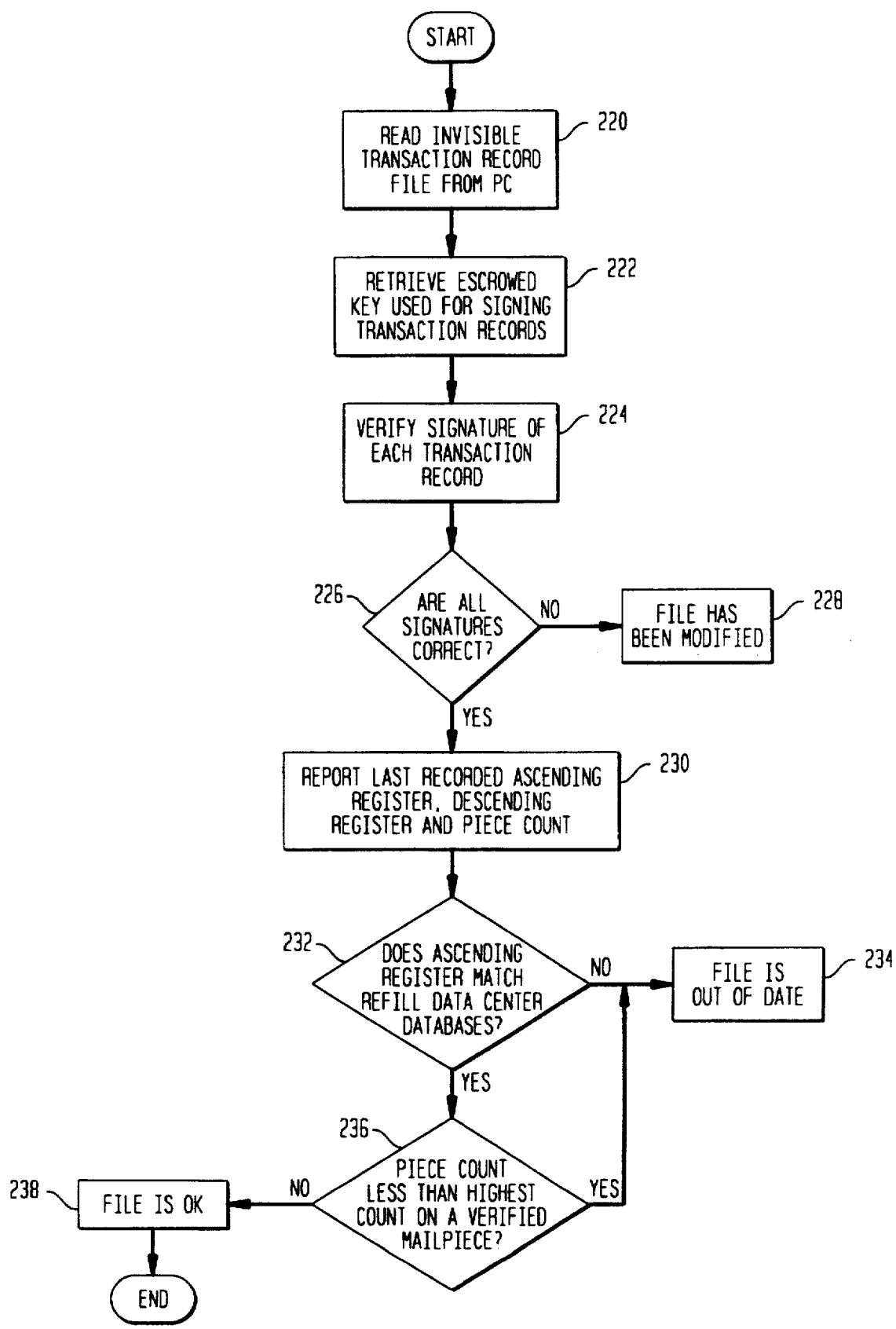

SYSTEM AND METHOD FOR DISASTER RECOVERY IN AN OPEN METERING SYSTEM

FIELD OF THE INVENTION

The present invention relates to advanced postage payment systems and, more particularly, to advanced postage payment systems having pre-computed postage payment information.

RELATED APPLICATIONS

The present application is related to the following U.S. patent application Ser. Nos. 08/575,107; 08/575,106, 08/574,746; 08/574,745; 08/575,110; 08/575,112; 08/575,109; 08/575,104; 08/574,749, and 08/575,111, each filed concurrently herewith, and assigned to the assignee of the present invention.

BACKGROUND OF THE INVENTION

Postage metering systems are being developed which employ digital printers to print encrypted information on a mailpiece. Such metering systems are presently categorized by the USPS as either closed systems or open systems. In a closed system, the system functionality is solely dedicated to metering activity. A closed system metering device includes a dedicated printer securely coupled to a metering or accounting function. In a closed system, since the printer is securely coupled and dedicated to the meter, printing cannot take place without accounting. In an open metering system, the system functionality is not dedicated solely to metering activity. An open system metering device includes a printer that is not dedicated to the metering activity, thus freeing system functionality for multiple and diverse uses in addition to the metering activity. An open system metering device is a postage evidencing device (PED) with a non-dedicated printer that is not securely coupled to a secure accounting module.

Typically, the postage value for a mailpiece is encrypted together with other data to generate a digital token which is then used to generate a postage indicia that is printed on the mailpiece. A digital token is encrypted information that authenticates the information imprinted on a mailpiece including postal value. Examples of systems for generating and using digital tokens are described in U.S. Pat. Nos. 4,757,537, 4,831,555, 4,775,246, 4,873,645 and 4,725,718, the entire disclosures of which are hereby incorporated by reference. These systems employ an encryption algorithm to encrypt selected information to generate at least one digital token for each mailpiece. The encryption of the information provides security to prevent altering of the printed information in a manner such that any misuse of the tokens is detectable by appropriate verification procedures.

Typical information which may be encrypted as part of a digital token includes origination postal code, vendor identification, data identifying the PED, piece count, postage amount, date, and, for an open system, destination postal code. These items of information, collectively referred to as Postal Data, when encrypted with a secret key and printed on a mail piece provide a very high level of security which enables the detection of any attempted modification of a postal revenue block or a destination postal code. A postal revenue block is an image printed on a mail piece that includes the digital token used to provide evidence of postage payment. The Postal Data may be printed both in encrypted and unencrypted form in the postal revenue block.

Postal Data serves as an input to a Digital Token Transformation which is a cryptographic transformation computation that utilizes a secret key to produce digital tokens. Results of the Digital Token Transformation, i.e., digital tokens, are available only after completion of the Accounting Process.

Transaction data stored in a metering system typically include, for example, ascending register, descending register, piece count, and any other necessary information that must be maintained with high integrity for each transaction of the meter. Such data may be needed to provide a user with a refund in the case of meter failure or meter loss.

Heretofore, the integrity of data in a meter is maintained using redundant non-volatile memory. If the meter is damaged, this data must be recovered and verified. Recovery often involves opening the meter and directly reading the data in memory by attaching a clip to the memory chip.

For open metering systems, the metering unit may be a portable device such as a smart card or a PCMCIA card. Portable metering units may also be used with closed metering systems. Such portable cards present a problem with regard to retrieving transaction data when the portable card is lost or damaged beyond accessibility of such transaction records.

SUMMARY OF THE INVENTION

The present invention provides a system and method for disaster recovery for an open metering system. The vault of the open metering system must be a secure device because it contains the accounting information of the amount of postage remaining in the vault and the postage printed. However, the very nature of the security makes it hard to recover postal funds in the event a malfunction occurs and the vault cannot be accessed by normal operation. The present invention enhances the reliability of a PC meter system by using the hard disk of the user PC to backup the accounting information of the vault. This provides a benefit that certain functions, such as account reconciliation, can be performed even when vault malfunctions or is lost. Such backup is unavailable in conventional postage meters.

For further security, the backup transaction data can be cryptographically signed by the vault before being stored on the hard drive to prevent tampering. The number of transactions that are maintained on the hard drive is limited only by the available storage space on the hard drive. Preferably, at least all transactions since the last refill would be maintained as backup.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIG. 6 is a flow chart of the recovery process when a vault card is damaged or lost.

DETAILED DESCRIPTION OF THE PRESENT INVENTION

Figure 1:
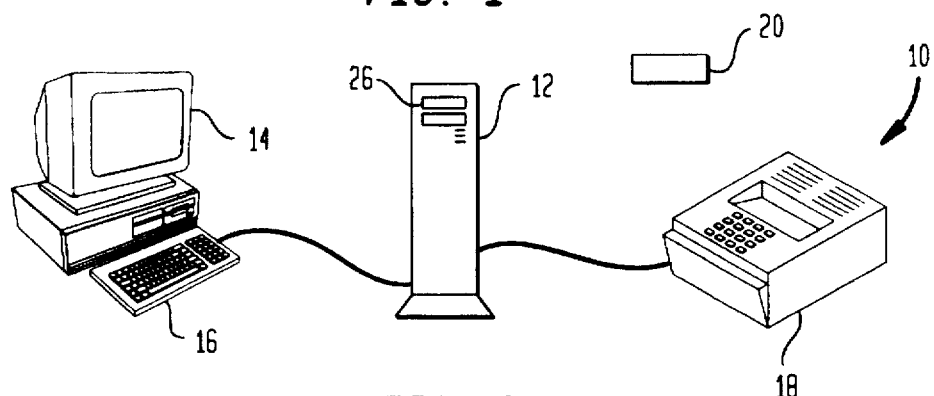
FIG. 1 is a block diagram of a PC-based metering system in which the present invention operates.
Figure 2:
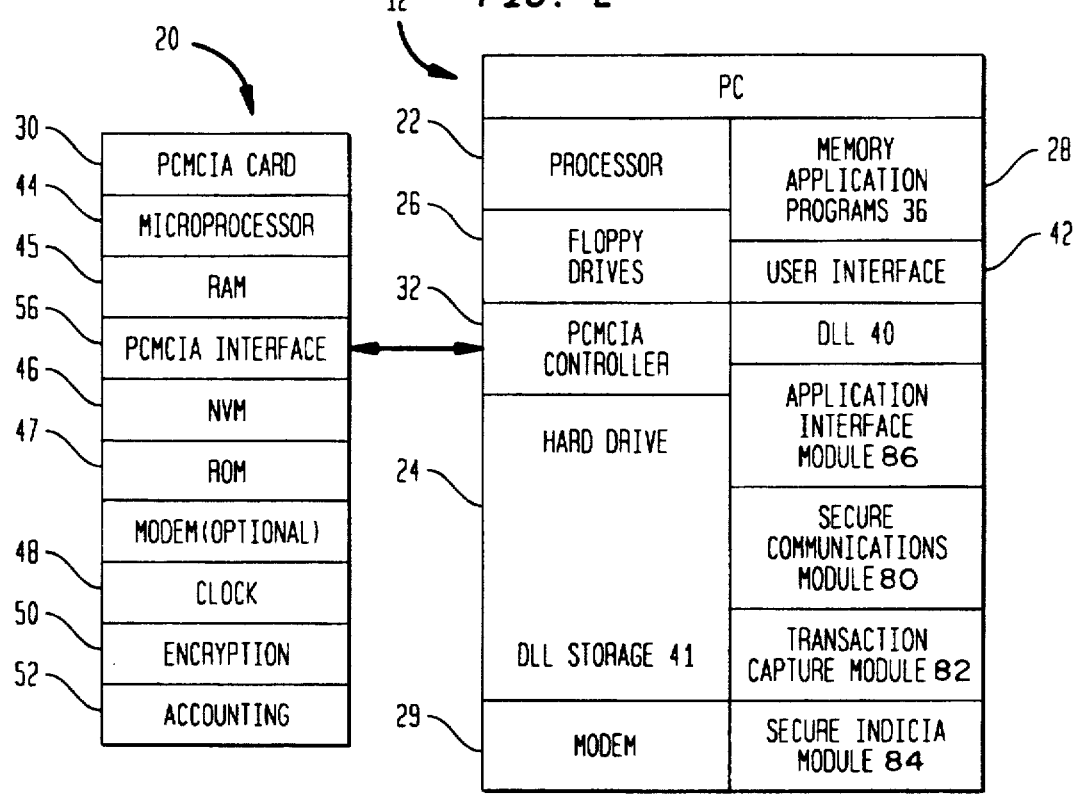
FIG. 2 is a schematic block diagram of the PC-based metering system of FIG. 1 including a removable vault card and a DLL in the PC.

In describing the present invention, reference is made to the drawings, wherein there is seen in FIGS. 1 and 2 an open system PC-based postage meter, also referred to herein as a PC meter system, generally referred to as 10, comprising a conventional personal computer configured to operate as a host to a removable metering device or electronic vault, generally referred to as 20, in which postage funds are stored. As used herein, the term personal computer is used generically and refers to present and future microprocessing systems with at least one processor operatively coupled to user interface means, such as a display and keyboard, and storage media. The personal computer may be a workstation that is accessible by more than one user.

PC meter system 10 uses the personal computer and its printer to print postage on envelopes at the same time it prints a recipient's address or to print labels for pre-addressed return envelopes or large mailpieces. It will be understood that although the preferred embodiment of the present invention is described with regard to a postage metering system, the present invention is applicable to any value metering system that includes transaction evidencing.

The PC-based postage meter 10 includes a personal computer (PC) 12, a display 14, a keyboard 16, and an unsecured digital printer 18, preferably a laser or ink-jet printer. PC 12 includes a conventional processor 22, such as the 80486 and Pentium processors manufactured by Intel, and conventional hard drive 24, floppy drive(s) 26, and memory 28. Electronic vault 20, which is housed in a removable card, such as PCMCIA card 30, is a secure encryption device for postage funds management, digital token generation and traditional accounting functions. PC meter system 10 may also include an optional modem 29 which is located preferably in PC 12. Modem 29 may be used for communicating with a Postal Service or a postal authenticating vendor for recharging funds (debit or credit). A description of such communication by modem is described in U.S. Pat. No. 4,831,555, incorporated herein by reference. In an alternate embodiment the modem may be located in PCMCIA card 30.

PC meter system 10 further includes a Windows-based PC software module 34 (FIGS. 3 and 4) that is accessible from conventional Windows-based word processing, database and spreadsheet application programs 36. PC software module 34 includes a vault dynamic link library (DLL) 40, a user interface module 42, and a plurality of sub-modules that control the metering functions. The DLL is an application programming interface (API) that is used by in Windows-based programs. It will be understood that the present invention is suitable for use with an API corresponding to other than Windows-based programs.

DLL module 40 securely communicates with vault 20 and provides an open interface to Microsoft Windows-based application programs 36 through user interface module 42. DLL module 40 also securely stores an indicia image and a copy of the usage of postal funds of the vault. User interface module 42 provides application programs 36 access to an electronic indicia image from DLL module 40 for printing the postal revenue block on a document, such as an envelope or label. User interface module 42 also provides application programs the capability to initiate remote refills and to perform administrative functions.

Thus, PC-based meter system 10 operates as a conventional personal computer with attached printer that becomes a postage meter upon user request. Printer 18 prints all documents normally printed by a personal computer, including printing letters and addressing envelopes, and prints postage indicia.

A description of the key components of PC-based meter system 10 are described below followed by a description of the preferred operation of PC-based meter system 10. A description of the digital token generation process is disclosed in co-pending U.S. patent application Ser. Nos. |Attorney Dockets E-416, E-415 and E-419|, which are incorporated herein in their entirety by reference.

The vault is housed in a PCMCIA I/O device, or card, 30 which is accessed through a PCMCIA controller 32 in PC 12. A PCMCIA card is a credit card size peripheral or adapter that conforms to the standard specification of the Personal Computer Memory Card International Association.

Figure 3:
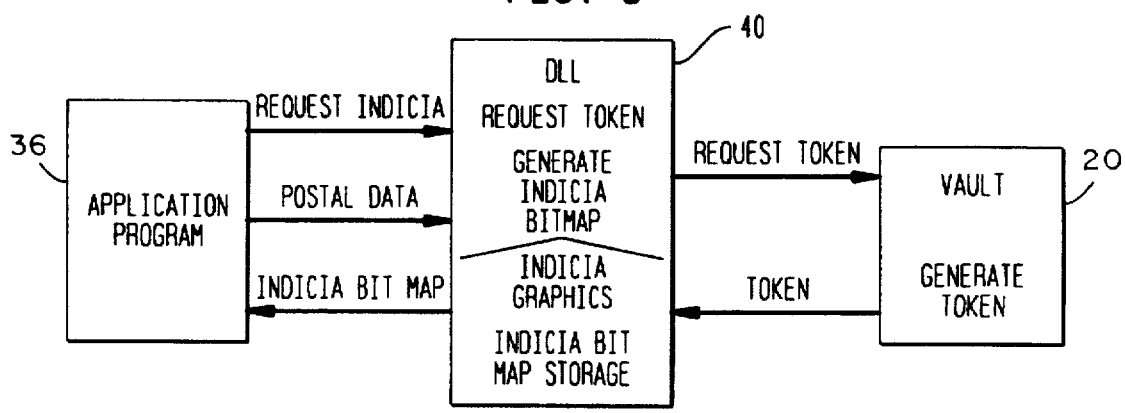
FIG. 3 is a schematic block diagram of the DLL in the PC-based metering system of FIG. 1 including interaction with the vault to issue and store digital tokens.

Referring now to FIGS. 2 and 3, the PCMCIA card 30 includes a microprocessor 44, non-volatile memory (NVM) 46, clock 48, an encryption module 50 and an accounting module 52. The encryption module 50 may implement the NBS Data Encryption Standard (DES) or another suitable encryption scheme. In the preferred embodiment, encryption module 50 is a software module. It will be understood that encryption module 50 could also be a separator device, such as a separate chip connected to microprocessor 44. Accounting module 52 may be EEPROM that incorporates ascending and descending registers as well as postal data, such as origination ZIP Code, vendor identification, data identifying the PC-based postage meter 10, sequential piece count of the postal revenue block generated by the PC-based postage meter 10, postage amount and the date of submission to the Postal Service. As is known, an ascending register in a metering unit records the amount of postage that has been dispensed, i.e., issued by the vault, in all transactions and the descending register records the value, i.e., amount of postage, remaining in the metering unit, which value decreases as postage is issued.

The hardware design of the vault includes an interface 56 that communicates with the host processor 22 through PCMCIA controller 32. Preferably, for added physical security, the components of vault 20 that perform the encryption and store the encryption keys (microprocessor 44, ROM 47 and NVM 46) are packaged in the same integrated circuit device/chip that is manufactured to be tamper proof. Such packaging ensures that the contents of NVM 46 may be read only by the encryption processor and are not accessible outside of the integrated circuit device. Alternatively, the entire card 30 could be manufactured to be tamper proof.

The functionality of DLL 40 is a key component of PC-base meter 10. DLL 40 includes both executable code and data storage area 41 that is resident in hard drive 24 of PC 12. In a Windows environment, a vast majority of applications programs 36, such as word processing and spreadsheet programs, communicate with one another using one or more dynamic link libraries. PC-based meter 10 encapsulates all the processes involved in metering, and provides an open interface to vault 20 from all Windows-based applications capable of using a dynamic link library. Any application program 36 can communicate with vault microprocessor 44 in PCMCIA card 30 through DLL 40.

DLL 40 includes the following software sub-modules: secure communications 80, transaction captures 82, secure indicia image creation and storage 84, and application interface module 86. The present invention relates to the transaction captures sub-module which is described below. A more detailed description of PC meter system 10 is provided in related U.S. patent application Ser. No. |Attorney Docket E-421| filed concurrently herewith and incorporated herein in its entirety by reference.

Backup On Hard Drive

Vault 20 must be a secure device because it contains the accounting information of the amount of postage remaining in the vault and the postage printed. However, the very nature of the security makes it hard to recover postal funds in the event a malfunction occurs and the vault cannot be accessed by normal operation. The present invention enhances the reliability of a PC meter system by using the hard disk of the user PC to backup the accounting information of the vault. As previously described, the transaction capture sub-module 82 stores transaction files as backup files on hard drive 24. This provides a benefit that certain functions, such as account reconciliation, can be performed even when vault 20 malfunctions. Such backup is unavailable in conventional postage meters.

For further security, the backup transaction data can be encrypted before being stored on hard drive 24 to prevent tampering. The number of transactions that are maintained on hard drive 24 is limited only by the available storage space on hard drive 24. Preferably, at least all transactions since the last refill would be maintained as backup.

In the preferred embodiment of the present invention, the transaction record is cryptographically signed by the meter and stored on hard drive 24 in the transaction record file associated with the meter. By signing the transaction records in this manner, a user then cannot modify the data without detection. If the user tries to replay an old value of the data, it will not match any data remaining in the meter, and it will not match the piece counts of the latest mail pieces paid with the meter. The signed data can be stored in the meter base. Thus, the present invention provides a system and method for reliably recovering funds for lost, stolen or damaged meters based on the signed data stored on the hard drive. A similar function can be provided for closed system meters with a removable vault.

The meter transaction record data is signed cryptographically, for example with a message authentication code (MAC). The signed data is stored in a hidden file in hard drive 24. (For closed metering systems with a removable vault the signed data would be stored in the meter base.) The data stored on hard drive 24 of PC 12 can be recovered and authenticated against the most recent records of the data center and against any recent mailpiece piece counts recorded. The user cannot modify the data on hard drive 24 without detection. If the user deletes the data, then the funds may be unrecoverable.

If vault 20 is reported lost or stolen, the funds lost can be identified using the signed data on hard drive 24. The authenticity of the data can be checked by verifying the signature by vault 20. The freshness of the data can be checked by comparing the piece count in the signed data with the piece count on one of the most recent mailpieces mailed. For example, if the postal service frequently checks indicia and records the most recent piece count for each meter, then the postal service records can be used to authenticate the freshness of the data. If the data center records the value of the piece count at the most recent refill of vault 24, then such data can also provide evidence for the freshness of the backup data stored on hard drive 24.

The signed data in the hidden file can be updated each time an indicia is processed or can be accumulated in an historical transaction record file.

Figure 4:
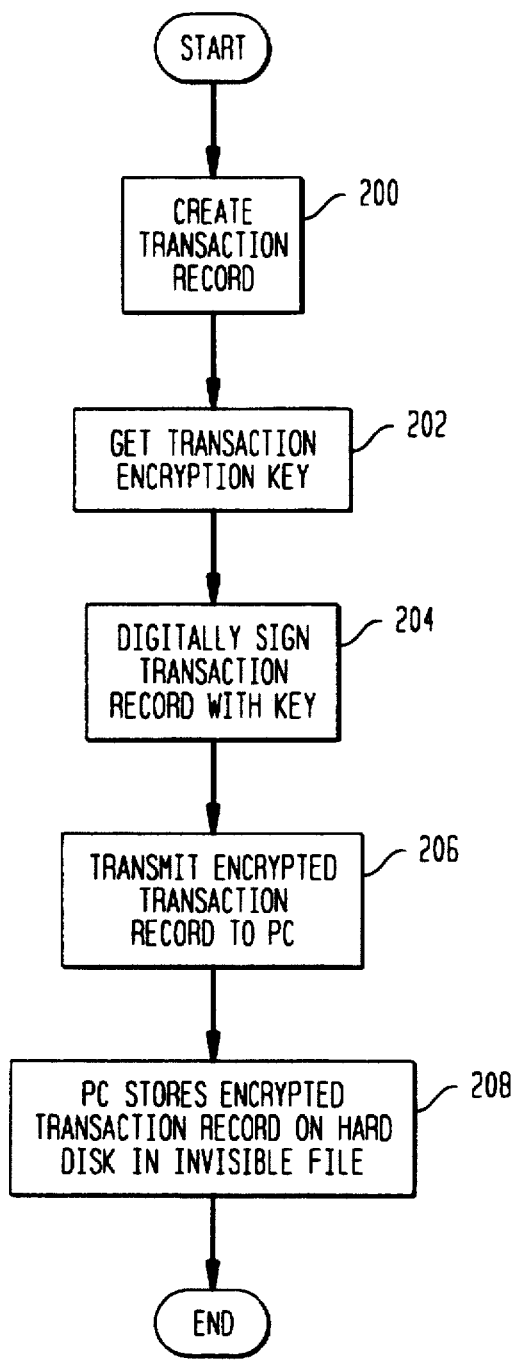
FIG. 4 is a flow chart of the vault process for signing and storing transaction records.

Referring now to FIG. 4, the process of cryptographically signing a transaction record is shown. At step 200, a transaction record is created, for example, when vault 20 issues a digital token or when vault 20 is refilled. At step 202, a transaction encryption key, stored in vault 20, for example, at manufacture, is obtained for digitally signing the transaction record at step 204. The signed transaction record is stored in vault 20 and sent to DLL 40 in PC 12 at 206. The signed transaction record is stored in an invisible DLL storage file 41 on hard drive 24 at step 208. Step 208 is described in more detail in the following paragraph.

Figure 5:
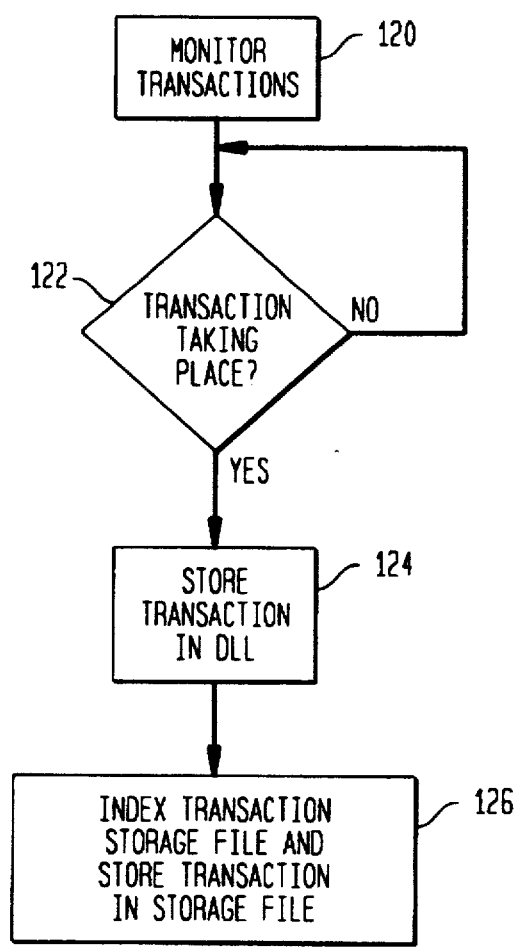
FIG. 5 is flow chart of the Transaction Capture submodule in the PC-based metering system of FIG. 1.

In accordance with the present invention, Transaction Capture sub-module 82 captures each transaction record received from vault 20 and records the transaction record in DLL 40 and in DLL storage area 41 on hard drive 24. If there is ample room on hard drive 24, such transaction captures can be stored for a plurality of different vaults. Referring now to FIG. 5, from the moment that a communication session is established, Transaction Capture sub-module 82 monitors message traffic at step 120, selectively captures each transaction record for token generations and refills, and stores such transaction records in DLL 40 at step 124 and in an invisible and write-protected file 83 in DLL storage area 41 at step 126. The information stored for each transaction record includes, for example, vault serial number, date, piece count, postage, postal funds available (descending register), tokens, destination postal code and the block check character. A predetermined number of the most recent records initiated by PC 12 are stored in file 83 which is an indexed historical file. In the preferred embodiment file 83 is indexed according to piece count but may searched according to addressee information. File 83 represents the mirror image of vault 20 at the time of the transaction except for the encryption keys and configuration parameters. Storing transaction records on hard drive 24 provides backup capability which is described below.

Referring now to FIG. 6, the process for recovering vault information when vault 20 is not available for information retrieval is shown. At step 220, the invisible transaction record file is read from DLL file 41 on hard drive 24. The encryption key used in signing the transaction record in vault 20 when the token was issued, is retrieved, at step 222, from an escrowed holding, for example, from the manufacturer or the Data Center. At step 224, the signature of preferably each transaction record is verified, although verifying less than all the transaction records may be deemed adequate. At 226, it is determined whether all the verified signatures are correct. If not correct, then this indicates at 228 that the DLL storage file 41 has been modified. If correct, then the last recorded ascending register, descending register and piece count are determined at step 230. A comparison is made with the ascending register read from DLL storage file 41 with the ascending register in the refill Data Center databases at step 232. If not the same, then, at step 234, the file is considered out of date which indicates tampering. If the same, then, at step 236, the piece count read from DLL storage file 41 is compared with the highest piece count verified on a mailpiece. If the retrieved piece count is less than the verified piece count then, at step 234, the file is considered out of date. If not less than, then the file is considered reliable at step 238 and the retrieved information is used in place of vault 20.

Thus in addition to storing meter transactions in the meter like convention postage meters, the present invention also stores transaction records on the PC hard drive in a secure manner. In this manner the present invention provides a means for disaster recovery when a vault card is lost, stolen or damaged beyond information retrieval.

While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A method of securely backing up vault data in a metering system that includes a host processor operatively coupled to a vault, comprising the steps of:

storing a predetermined set of vault data in the vault;

cryptographically signing in the vault the predetermined set of vault data;

sending the cryptographically signed vault data to the host processor;

storing the cryptographically signed vault data in a data file of the host processor.

2. The method of claim 1 wherein the steps in claim 1 are performed whenever a transaction is completed by the vault.

3. The method of claim 2 comprising the further step of:

indexing in the data file each storage of the cryptographically signed vault data to create a historical log of vault transactions.

4. A transaction evidencing system, comprising a host processor including storage means;

vault means operatively coupled to said host processor, said vault means including digital token generation means and transaction accounting means;

a printer operatively couple to said host processor;

means in said host processor for issuing a request for at least one digital token, said request for digital token including predetermined information required by said token generation means;

means in said host processor for securely communicating with said vault means, said communicating means sending said request for digital token to said vault means and receiving from said vault means a digital token generated by said token generation means;

means in said host processor for capturing in said storage means a transaction record corresponding to said digital token, said transaction record including said digital token and said predetermined information; and means operatively coupled to said host processor for generating an indicia bitmap from said digital token.

5. The transaction evidencing system of claim 4, wherein said transaction record is encrypted before being captured in said storage means.

6. The transaction evidencing system of claim 4, wherein a plurality of consecutive ones of said transaction records are stored in said storage means as backup to information stored in said vault means.

7. The transaction evidencing system of claim 4 wherein said host processor is a personal computer (PC) including conventional processor, memory and storage means and said printer is an unsecured, non-dedicated printer operatively coupled to said PC.

8. The transaction evidencing system of claim 5 wherein said vault means comprises a portable vault card that is removably coupled to said PC, said PC including means for removably coupling said vault card to said PC.

9. The transaction evidencing system of claim 8, wherein said storage means is a hard drive of said PC.

10. A method for recovering vault data, the method comprising the steps of:

retrieving cryptographically signed vault data from a data file in the host processor;

verifying the signature of the cryptographically signed vault data; and recovering the vault data from the cryptographically signed vault data when the signature is verified.

11. The method of claim 1 wherein the predetermined set of vault data includes descending register.

12. The method of claim 1 wherein the predetermined set of vault data includes ascending register.

13. The method of claim 1 wherein the predetermined set of vault data includes piece count.

14. The method of claim 1 wherein said step of cryptographically signing comprises signing with a key stored in the vault.

15. The method of claim 1 wherein the step of storing comprises storing on a hard drive of the host processor.

16. The method of claim 1 comprising the further step of:

indexing in the data file each storage of the cryptographically signed vault data to create a log of at least the last vault transaction.

17. A transaction evidencing system vault device, comprising:

means for storing a predetermined set of vault data;

means for cryptographically signing the predetermined set of vault data; and means for sending from the vault the cryptographically signed vault data.

18. The device of claim 17, further comprising:

means for coupling the vault device to a host system; wherein said means for sending sends the vault the cryptographically signed vault data to the host system.

19. The device of claim 17 wherein the predetermined set of vault data includes descending register.

20. The device of claim 17 wherein the predetermined set of vault data includes ascending register.

21. The device of claim 17 wherein the predetermined set of vault data includes piece count.

22. The device of claim 17 wherein said means for cryptographically signing comprises signing with a key stored in the vault device.

23. A host processor for use in a transaction evidencing system, comprising:

vault means coupled thereto;

storage means having stored thereon cryptographically signed predetermined set of vault data.

24. The host processor of claim 23 wherein said cryptographically signed predetermined set of vault data includes descending register, a register, and piece count.

25. The transaction evidencing system of claim 4 wherein said predetermined information includes information required by said token generation means.

* * * * *